(12) United States Patent
Sato et al.

(10) Patent No.: US 10,305,128 B2
(45) Date of Patent: May 28, 2019

(54) CELL SYSTEM AND CONTROL METHOD FOR CELL SYSTEM

(71) Applicant: NISSAN MOTOR CO., LTD., Yokohama-shi, Kanagawa (JP)

(72) Inventors: Masashi Sato, Kanagawa (JP); Kotaro Akashi, Kanagawa (JP); Masanobu Sakai, Kanagawa (JP); Hidetaka Nishimura, Kanagawa (JP); Kenji Kobayashi, Kanagawa (JP); Keita Tsuji, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 129 days.

(21) Appl. No.: 15/323,819

(22) PCT Filed: Jul. 8, 2014

(86) PCT No.: PCT/JP2014/068175
§ 371 (c)(1),
(2) Date: Jan. 4, 2017

(87) PCT Pub. No.: WO2016/006036
PCT Pub. Date: Jan. 14, 2016

(65) Prior Publication Data
US 2017/0141420 A1    May 18, 2017

(51) Int. Cl.
*H01M 8/24* (2016.01)
*H01M 8/241* (2016.01)
(Continued)

(52) U.S. Cl.
CPC ......... *H01M 8/04955* (2013.01); *H01M 8/04* (2013.01); *H01M 8/04544* (2013.01);
(Continued)

(58) Field of Classification Search
CPC ......... H01M 8/04955; H01M 8/04544; H01M 8/1004; H01M 8/241; H02J 7/0019; H02J 7/0021
See application file for complete search history.

(56) References Cited

U.S. PATENT DOCUMENTS

| 7,964,985 B2 * | 6/2011 | Ozaki ................... B60L 3/0046 307/10.1 |
| 2013/0265005 A1 | 10/2013 | Kurita |
| 2015/0326041 A1* | 11/2015 | Hamada ................ H01M 10/44 320/103 |

FOREIGN PATENT DOCUMENTS

| EP | 2 012 338 A1 | 1/2009 |
| JP | 2009-027848 A | 2/2009 |

(Continued)

*Primary Examiner* — Renee S Luebke
*Assistant Examiner* — Paul D Baillargeon
(74) *Attorney, Agent, or Firm* — Foley & Lardner LLP

(57) ABSTRACT

A cell system includes a laminated battery, a plurality of battery cells being laminated in the laminated battery, a first switch connected to a positive electrode of the laminated battery and configured to switch connection to the positive electrode to a shut-off state, and a second switch connected to a negative electrode of the laminated battery and configured to switch connection to the negative electrode to a shut-off state. Furthermore, the cell system includes a circuit to be connected at least either between the positive electrode and the first switch or between the negative electrode and the second switch; and a controller configured to shift control timings of the first switch and the second switch from the shut-off state to a connected state according to an electrical capacitance generated between the positive electrode and the negative electrode.

8 Claims, 11 Drawing Sheets

(51) Int. Cl.
*H01M 8/10* (2016.01)
*H01M 8/04955* (2016.01)
*H01M 8/04* (2016.01)
*H02J 1/00* (2006.01)
*H01M 8/04537* (2016.01)
*H01M 8/1004* (2016.01)
*H02J 7/00* (2006.01)
*B60L 11/18* (2006.01)

(52) U.S. Cl.
CPC ........... *H01M 8/10* (2013.01); *H01M 8/1004* (2013.01); *H01M 8/24* (2013.01); *H01M 8/241* (2013.01); *H02J 1/00* (2013.01); *H02J 7/0019* (2013.01); *H02J 7/0021* (2013.01); *H02J 7/0031* (2013.01); *B60L 11/1881* (2013.01); *B60L 2270/147* (2013.01); *Y02T 90/34* (2013.01)

(56) References Cited

FOREIGN PATENT DOCUMENTS

JP 4746593 B2 8/2011
JP 2013-219872 A 10/2013

\* cited by examiner

CELL SYSTEM AND CONTROL METHOD FOR CELL SYSTEM

TECHNICAL FIELD

This invention relates to a cell system with a circuit to be connected to a laminated battery and a control method for cell system.

BACKGROUND ART

JP4746593B describes that an order of connection of two switches that respectively provided in power lines of a positive electrode and a negative electrode connecting between a fuel cell and a load is changed when a system is started.

SUMMARY OF INVENTION

In a cell system as described above, for example, in a state where the circuit is connected to the power lines, noise may be mixed into a circuit for detecting a state of a fuel cell due to a stray electrical capacitance between power lines.

The present invention was developed in view of such a problem and aims to provide a cell system for suppressing noise to be mixed into a circuit connected to the cell system.

According to one aspect of the present invention, a cell system includes a laminated battery, a plurality of battery cells being laminated in the laminated battery, a first switch connected to a positive electrode of the laminated battery and configured to switch connection to the positive electrode to a shut-off state, and a second switch connected to a negative electrode of the laminated battery and configured to switch connection to the negative electrode to a shut-off state. Furthermore, the cell system includes a circuit to be connected at least either between the positive electrode and the first switch or between the negative electrode and the second switch, and a controller configured to shift control timings of the first switch and the second switch from the shut-off state to a connected state according to an electrical capacitance generated between the positive electrode and the negative electrode.

DESCRIPTION OF EMBODIMENTS

Hereinafter, embodiments of the present invention are described with reference to the accompanying drawings.

(First Embodiment)

Figure 1:
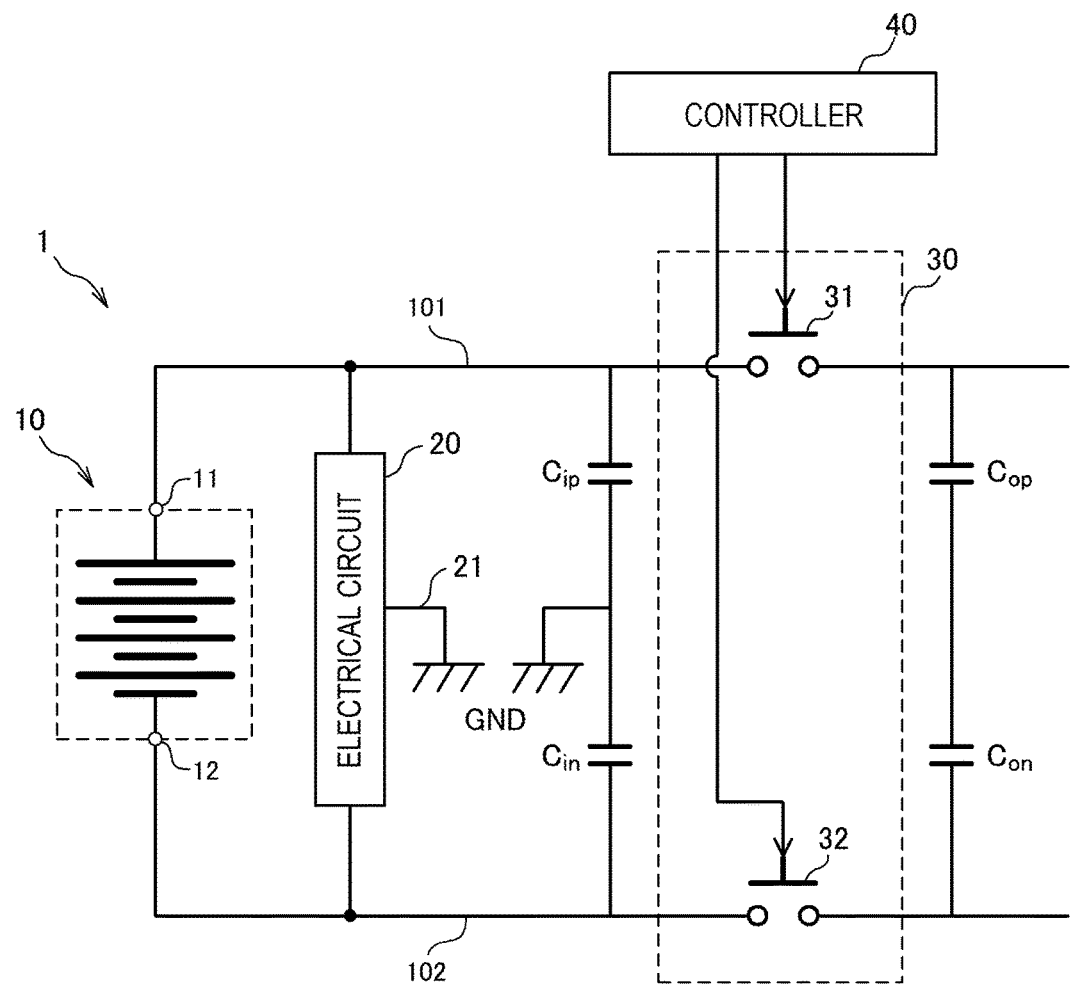
FIG. 1 is an equivalent circuit diagram showing the configuration of a fuel cell system according to a first embodiment of the present invention.

FIG. 1 is an equivalent circuit diagram showing the configuration of a fuel cell system in a first embodiment of the present invention.

A fuel cell system 1 is a cell system for causing a fuel cell to generate power by supplying anode gas (fuel gas) and cathode gas (oxidant gas) to the fuel cell. The fuel cell system 1 is mounted, for example, in an electric vehicle.

The fuel cell system 1 includes a fuel cell stack 10, an electrical circuit 20 and a breaker 30. The breaker 30 includes a positive electrode switch 31 and a negative electrode switch 32.

The fuel cell stack 10 is a laminated battery in which several hundreds of fuel cells are laminated as a plurality of battery cells. A positive electrode terminal 11 is provided in the uppermost stage on a positive electrode side of the fuel cell stack 10 and a negative electrode terminal 12 is provided in the lowermost stage on a negative electrode side. The positive electrode terminal 11 of the fuel cell stack 10 is connected to a power supply line 101. The negative electrode terminal 12 is connected to a power supply line 102.

The fuel cell stack 10 generates power upon receiving the supply of the anode gas and the cathode gas to the laminated fuel cells. In the fuel cell, an electrolyte membrane is sandwiched between an anode electrode (fuel electrode) and a cathode electrode (oxidant electrode) and power is generated by receiving the anode gas containing hydrogen to the anode electrode and cathode gas containing oxygen to the cathode electrode from outside. Electrode reactions (power generation reactions) proceed in both anode and cathode electrodes as follows.

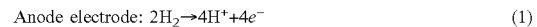

$$\text{Anode electrode: } 2H_2 \rightarrow 4H^+ + 4e^- \qquad (1)$$

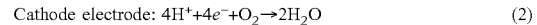

$$\text{Cathode electrode: } 4H^+ + 4e^- + O_2 \rightarrow 2H_2O \qquad (2)$$

The fuel cell stack 10 is, for example, connected to an electrical load (not shown) via the breaker 30. Examples of the electrical load include an electric motor, a DC/DC converter connected to the electric motor and an auxiliary machine of the fuel cell stack 10. The auxiliary machine of the fuel cell stack 10 is a component provided to cause the fuel cell stack 10 to generate power and examples thereof include a compressor for supplying the cathode gas to the fuel cell stack 10.

The electrical circuit 20 is a circuit to be connected to the fuel cell stack 10. The electrical circuit 20 detects, for example, an operating state such as a voltage or current of the fuel cell stack 10. In the present embodiment, the electrical circuit 20 measures an internal resistance of the fuel cell stack 10.

The electrical circuit 20 is connected in parallel between the fuel cell stack 10 and the breaker 30. Specifically, the electrical circuit 20 is connected to the power supply line 101 wired between the positive electrode terminal 11 of the fuel cell stack 10 and the positive electrode switch 31 and connected to the power supply line 102 wired between the negative electrode terminal 12 and the negative electrode switch 32.

Further, the electrical circuit 20 is connected to a ground line 21 grounded (GND) to a chassis or the like. The ground line 21 is a reference line for supplying a ground potential of 0 (zero) V serving as a reference when the electrical circuit 20 operates. Specifically, the ground line 21 is a common signal line in the fuel cell system 1 independent of the electrical circuit 20.

In the present embodiment, the electrical circuit 20 includes an internal circuit insulated from the fuel cell stack 10. In the electrical circuit 20, the internal circuit is insulated from the fuel cell stack 10 by an element for shutting off DC signals output from the positive electrode terminal 11 and the negative electrode terminal 12 of the fuel cell stack 10. The internal circuit is connected to the ground line 21 and has the ground potential of 0 V serving as a reference of the operation of the internal circuit supplied thereto from the ground line 21.

The breaker 30 shuts off power output from the fuel cell stack 10. The breaker 30 switches connection between the fuel cell stack 10 and the electrical load from a connected state to a shut-off state. The breaker 30 includes the positive electrode switch 31 and the negative electrode switch 32.

The positive electrode switch 31 is connected to the power supply line 101 wired between the positive electrode terminal 11 of the fuel cell stack 10 and a positive electrode terminal of the electrical load. In the present embodiment, the positive electrode switch 31 constitutes a first switch for switching connection between the positive electrode terminal 11 of the fuel cell stack 10 and the positive electrode terminal of the electrical load to a connected state or a shut-off state.

The negative electrode switch 32 is connected to the power supply line 101 wired between the negative electrode terminal 12 of the fuel cell stack 10 and a negative electrode terminal of the electrical load. In the present embodiment, the negative electrode switch 32 constitutes a second switch for switching connection between the negative electrode terminal 12 of the fuel cell stack 10 and the negative electrode terminal of the electrical load to a connected state or a shut-off state.

In the following description, the connected state (conductive state) is referred to as "ON" and the shut-off state (non-conductive state) is referred to as "OFF", concerning the connection of the positive electrode switch 31 and the negative electrode switch 32. The positive electrode switch 31 and the negative electrode switch 32 are controlled by a controller 40.

The controller 40 is a control means for controlling an operating state of the fuel cell stack 10. The controller 40 switches both the positive electrode switch 31 and the negative electrode switch 32 from OFF to ON when the fuel cell system 1 is started. In this way, generated power is supplied from the fuel cell stack 10 to the electrical load.

Further, when the fuel cell system 1 is stopped, the controller 40 switches both the positive electrode switch 31 and the negative electrode switch 32 from ON to OFF. In this way, the electrical load is separated from the fuel cell stack 10.

In the fuel cell system 1, an electrical capacitance (hereinafter, referred to as a "stray capacitance") is formed between the fuel cell stack 10 and the breaker 30 and between the breaker 30 and the electrical load.

Specifically, a stray capacitance Cip is formed between the power supply line 101 wired closer to the electrical circuit 20 than the positive electrode switch 31 and a ground line (GND) and a stray capacitance Cin is formed between the power supply line 102 wired closer to the electrical circuit 20 than the negative electrode switch 32 and the ground line (GND).

It should be noted that the ground line (GND) common to the ground line 21 connected to the electrical circuit 20 is equivalently connected between the stray capacitances Cip and Cin.

Further, a stray capacitance Cop is formed between the power supply line 101 wired closer to the electrical load than the positive electrode switch 31 and the ground line and a stray capacitance Con is formed between the power supply line 102 wired closer to the electrical load than the negative electrode switch 32 and the ground line.

Thus, when the positive electrode switch 31 and the negative electrode switch 32 are simultaneously switched from OFF to ON, electric charges are charged/discharged into/from these stray capacitances Cip, Cin, Cop and Con. Therefore, a surge current flows into the electrical circuit 20 via the ground line 21.

Figure 2:
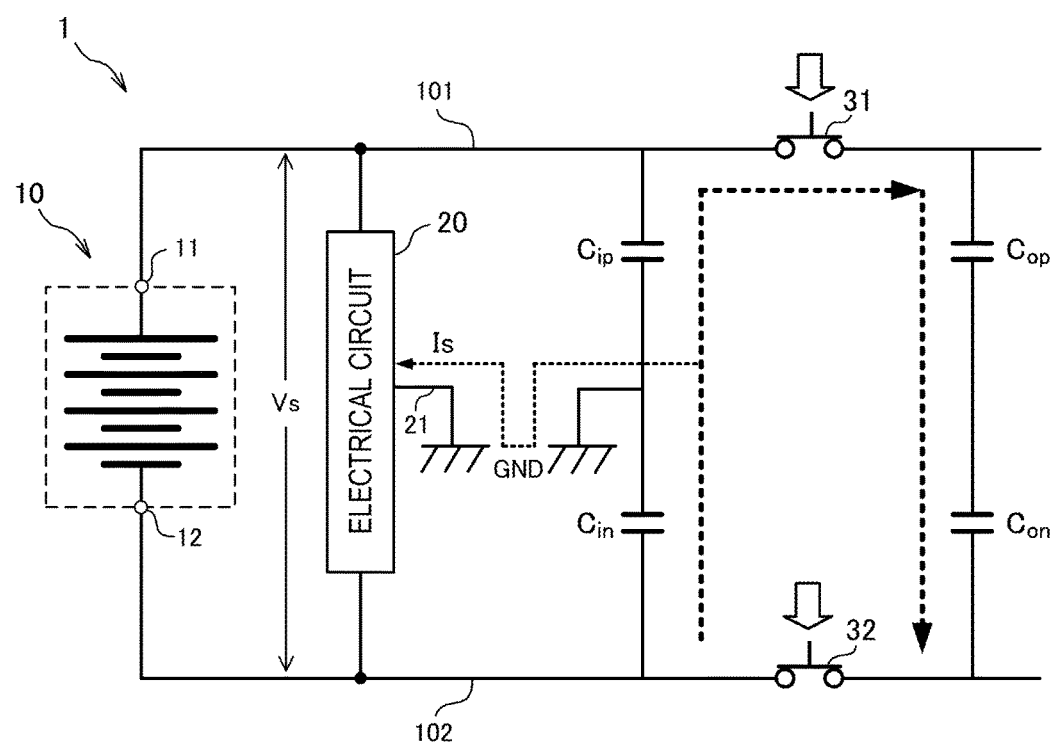
FIG. 2 is a reference diagram showing a movement of electric charges generated by a stray capacitance between power supply lines of a fuel cell stack when a positive electrode switch and a negative electrode switch are simultaneously turned on, FIG. 3 are time charts showing a technique for switching the positive electrode switch and the negative electrode switch in the first embodiment.

FIG. 2 is a diagram showing an example of the flow of electric charges moving by the charging/discharging of the stray capacitances Cip, Cin, Cop and Con when the positive electrode switch 31 and the negative electrode switch 32 are simultaneously switched from OFF to ON.

When the fuel cell stack 10 outputs a voltage, electric charges are charged into the stray capacitances Cip and Cin by a voltage (partial voltage) divided with the ground potential generated in the ground line (GDN) as a reference.

For example, if the positive electrode side and the negative electrode side of the fuel cell system 1 are symmetrical in shape and the stray capacitances of the positive electrode side and the negative electrode side with respect to GND are equal to each other, electric charges are charged into the stray capacitance Cip on the positive electrode side by a voltage of "225 V" and electric charges are charged into the stray capacitance Cin on the negative electrode side by a voltage of "−225 V" when a remaining voltage Vs of the fuel cell stack 10 is "450 V (volts)".

If the positive electrode switch 31 and the negative electrode switch 32 are simultaneously switched from OFF to ON in such a state, electric charges move from the stray capacitance Cip to the stray capacitance Cop as shown by a broken line and also move from the stray capacitance Con to the stray capacitance Cin.

At this time, due to the movement of the electric charges from the stray capacitance Cin to the stray capacitance Cip, some of the electric charges moving to the stray capacitance Cip move to the ground line (GND) from the stray capacitance Cin and flows as a surge current Is into the electrical circuit 20 connected to the ground line 21.

As just described, the electric charges charged into the stray capacitances Cip, Cin, Cop and Con move by simultaneously turning on the positive electrode switch 31 and the negative electrode switch 32, wherefore the surge current Is is mixed into the electrical circuit 20 via the ground line 21. At this time, a potential of the ground line 21 varies due to the surge current Is.

As the remaining voltage Vs of the fuel cell stack 10 after the stop of the fuel cell system 1 increases, the electric charges charged into the stray capacitances Cip and Cin increase, wherefore the surge current Is flowing into the electrical circuit 20 via the ground line 21 increases. The fuel cell stack 10 in which a plurality of fuel cells (battery cells) are laminated may be maintained in a state where the remaining voltage Vs after the stop is large since an output voltage is large.

For example, if the fuel cell system 1 is started with the remaining voltage Vs left large, the surge current Is mixed into the electrical circuit 20 is large.

Accordingly, in the present embodiment, the surge current Is flowing into the electrical circuit 20 via the ground line 21 is suppressed by shifting a connection timing of the positive electrode switch 31 and that of the negative electrode switch 32 from each other when the fuel cell stack 10 is connected.

Figure 3:
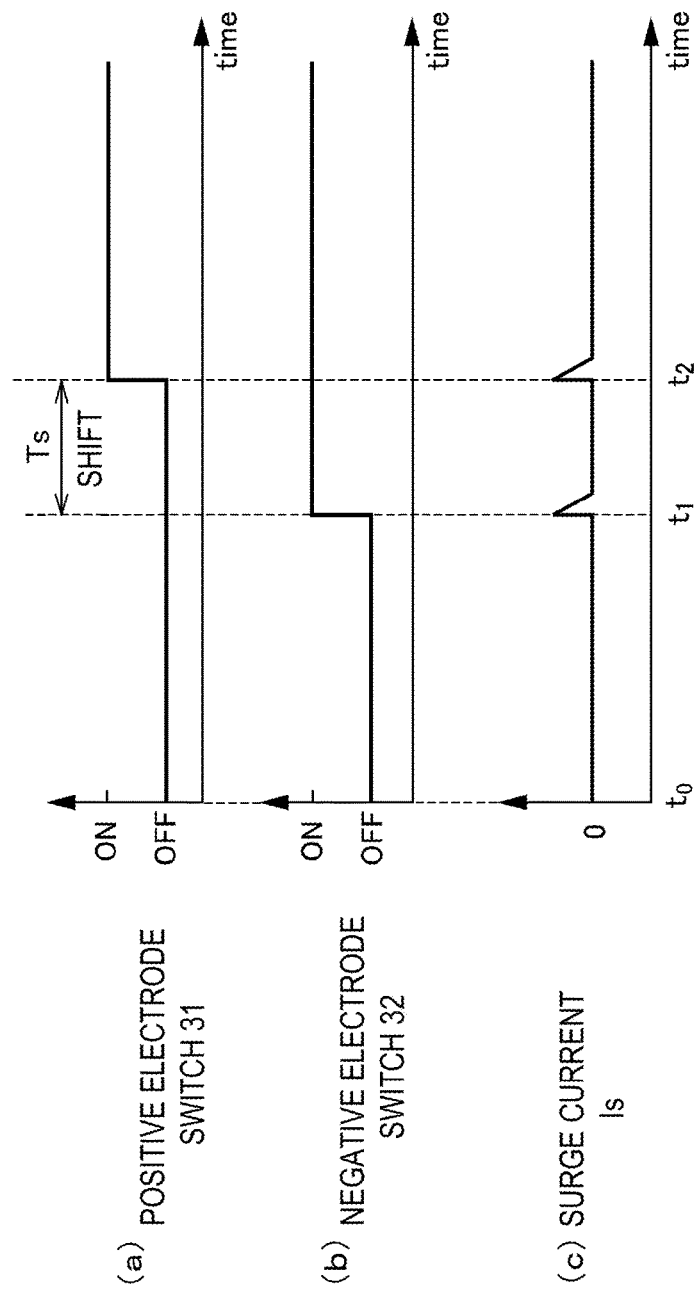

FIG. 3 are time charts showing a control technique for controlling the breaker 30 in the present embodiment. FIG. 3(*a*) is a chart showing a connected state of the positive electrode switch 31. FIG. 3(*b*) is a chart showing a connected state of the negative electrode switch 32. FIG. 3(*c*) is a chart showing the surge current Is mixed into the electrical circuit 20 via the ground line 21.

First, before time t0, the fuel cell system 1 is stopped and the positive electrode switch 31 and the negative electrode switch 32 are both set OFF.

At time t0, an operation switch of the fuel cell system 1 is set ON and the fuel cell stack 10 is started. In this way, the cathode gas and the anode gas are supplied to the fuel cell stack 10.

At time t1, the controller 40 sets only the negative electrode switch 32 ON without turning on the positive electrode switch 31 as shown in FIGS. 3(*a*) and 3(*b*).

In this way, the stray capacitances Con and Cin on the negative electrode side are connected and charging/discharging is performed between the stray capacitances Con and Cin, wherefore electric charges move from the stray capacitance Con to the stray capacitance Cin (discharging).

Associated with this, electric charges move from the stray capacitance Cin on the negative electrode side of the fuel cell system 1 to the stray capacitance Cip on the positive electrode side. Thus, as shown in FIG. 3(*c*), the surge current Is flows into the electrical circuit 20 via the ground line 21. Further, as the electric charges move from the stray capacitance Cin on the negative electrode side to the stray capacitance Cip on the positive electrode side, the electrical capacitance charged in the stray capacitance Cip decreases.

Since the positive electrode switch 31 is still OFF without being switched ON at this time, electric charges do not move between the stray capacitances Cop and Cip on the positive electrode side. Thus, as compared to the case where the positive electrode switch 31 and the negative electrode switch 32 are simultaneously set ON, less electric charges move between the stray capacitance Cin on the negative electrode side and the stray capacitance Cip on the positive electrode side, wherefore the surge current Is mixed into the electrical circuit 20 can be reduced.

Thereafter, the controller 40 confirms whether or not an elapsed time after the negative electrode switch 32 is switched ON has reached a standby time Ts.

The standby time Ts is a period determined in advance by an experiment or designing on the basis of the stray capacitance Cin on the negative electrode side of the fuel cell system 1. In this way, it can be avoided that the positive electrode switch 31 is turned ON before the surge current Is by the turning-ON of the negative electrode switch 32 decreases. This can prevent the occurrence of an operation failure of the electrical circuit 20 due to an excessively short shifting time and a large surge current Is.

When the elapsed time reaches the standby time Ts at time t2, the controller 40 switches the positive electrode switch 31 from OFF to ON as shown in FIG. 3(*a*).

Since the stray capacitances Cop and Cip on the positive electrode side are connected in this way, electric charges move from the stray capacitance Cip to the stray capacitance Cop on the positive electrode side. Associated with this, electric charges move between the stray capacitance Cin on the negative electrode side of the fuel cell system 1 and the stray capacitance Cip on the positive electrode side. Thus, as shown in FIG. 3(*c*), the surge current Is flows into the electrical circuit 20 via the ground line 21.

At this time, electric charges move from the stray capacitance Cin on the negative electrode side to the stray capacitance Cip on the positive electrode side only by charging/discharging performed by the stray capacitances Cop and Cip on the positive electrode side. Further, since charging/discharging is already performed by the stray capacitances Con and Cin on the negative electrode side at time t1, the electrical capacitance charged in the stray capacitance Cip is reduced. Thus, the surge current Is mixed into the electrical circuit 20 can be reduced as compared to the case where the positive electrode switch 31 and the negative electrode switch 32 are simultaneously set ON.

As just described above, since the amount of the surge current flowing into the electrical circuit 20 via the ground line 21 is temporally distributed by shifting the connection timing of the positive electrode switch 31 and that of the negative electrode switch 32, a peak value of the surge current Is can be reduced to half. Thus, influences given to the operation of the electrical circuit 20 can be reduced.

Figure 4:
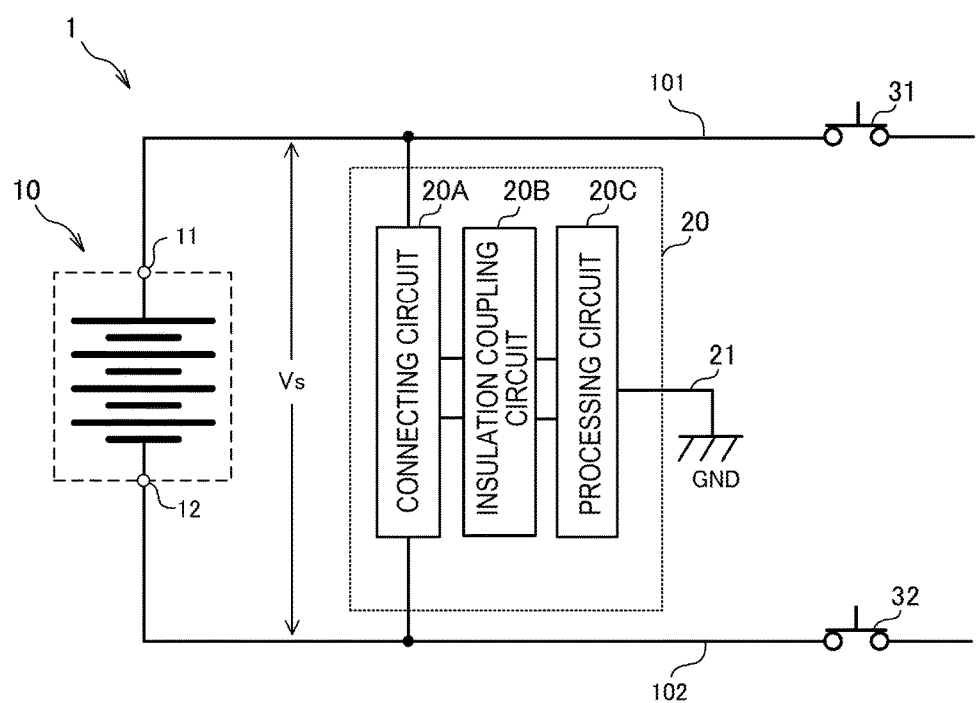
FIG. 4 is a block diagram showing a configuration example of an electrical circuit.

FIG. 4 is a circuit diagram showing an example of the configuration of the electrical circuit 20 in the present embodiment.

The electrical circuit 20 includes a connecting circuit 20A, an insulation coupling circuit 20B and a processing circuit 20C.

The connecting circuit 20A is connected to each of the positive electrode terminal 11 and the negative electrode terminal 12 of the fuel cell stack 10. The connecting circuit 20A outputs a signal output from the positive electrode terminal 11 to the processing circuit 20C via the insulation coupling circuit 20B and outputs a signal output from the negative electrode terminal 12 to the processing circuit 20C via the insulation coupling circuit 20B.

The insulation coupling circuit 20B is an insulating circuit for propagating a signal output from the connecting circuit 20A to the processing circuit 20C while electrically insulating between the connecting circuit 20A and the processing circuit 20C. The insulation coupling circuit 20B is realized by a capacitor, a transformer or the like.

In the present embodiment, the insulation coupling circuit 20B includes a capacitor connected between the positive electrode terminal 11 of the fuel cell stack 10 and the processing circuit 20C and a capacitor connected between the negative electrode terminal 12 of the fuel cell stack 10 and the processing circuit 20C.

The processing circuit 20C processes a signal output from the insulation coupling circuit 20B. Specifically, the processing circuit 20C is an internal circuit for processing signals output from the positive electrode terminal 11 and the negative electrode terminal 12 via the insulation coupling circuit 20B.

Figure 5:
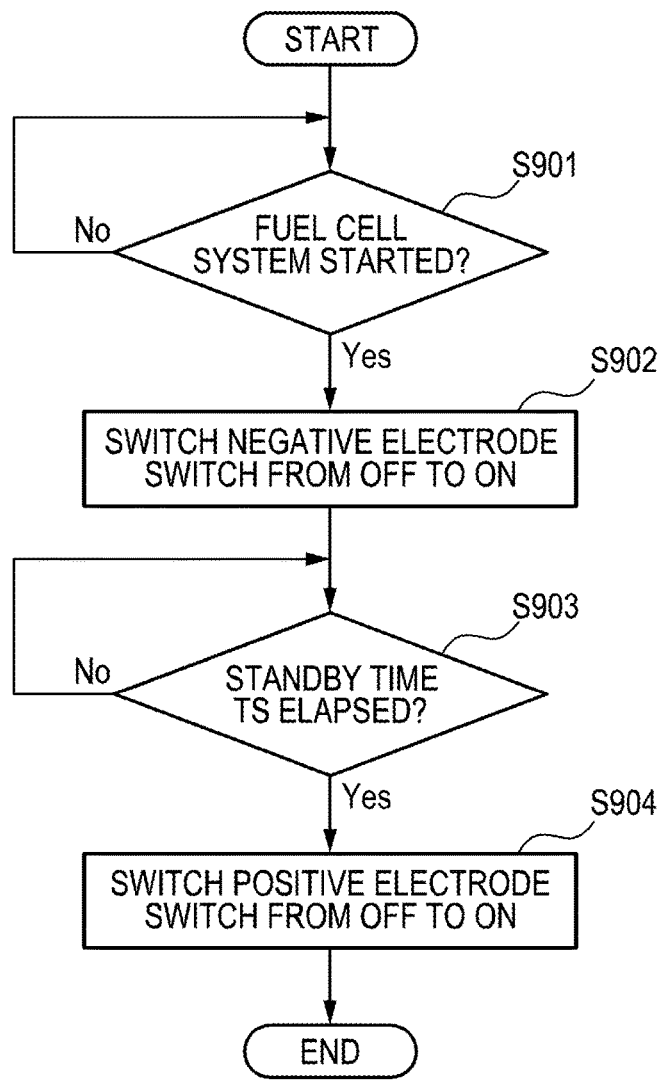
FIG. 5 is a flow chart showing a control method for controlling the fuel cell system.

FIG. 5 is a flow chart showing a control method for controlling the positive electrode switch 31 and the negative electrode switch 32 in the present embodiment.

In Step S901, the controller 40 judges whether or not the operation switch of the fuel cell system 1 has been set from a stopped state to a startup state. The controller 40 judges that the fuel cell system 1 has started if the operation switch has been set to the startup state.

In Step S902, the controller 40 switches only the negative electrode switch 32 from OFF to ON without controlling the positive electrode switch 31 if the fuel cell system 1 has been started. Since this causes only the stray capacitance Cin formed on the negative electrode side of the fuel cell system 1 to be discharged, the surge current Is mixed into the electrical circuit 20 can be reduced as compared to the case where the positive electrode switch 31 and the negative electrode switch 32 are simultaneously set ON.

In Step S903, the controller 40 judges whether or not an elapsed time after the negative electrode switch 32 is turned ON has exceeded the predetermined standby time Ts. The controller 40 waits to set the positive electrode switch 31 ON until the elapsed time exceeds the standby time Ts.

In Step S904, the controller 40 judges that the surge current Is mixed into the electrical circuit 20 has become almost zero and switches the positive electrode switch 31 from OFF to ON if the elapsed time has exceeded the standby time Ts. Since this causes only the stray capacitance Cip formed on the positive electrode side of the fuel cell system 1 to be discharged, the surge current Is mixed into the electrical circuit 20 can be reduced as compared to the case where the stray capacitances Cip and Cin are simultaneously discharged.

After the positive electrode switch 31 is switched ON, the control method of the fuel cell system 1 is finished.

According to the first embodiment of the present invention, the fuel cell system 1 with the electrical circuit 20 connected between the positive electrode terminal 11 and the negative electrode terminal 12 of the fuel cell stack 10, which is a laminated battery, includes the positive electrode switch 31 connected to the positive electrode terminal 11 and the negative electrode switch 32 connected to the negative electrode terminal 12. The electrical circuit 20 is connected between the positive electrode terminal 11 of the fuel cell stack 10 and the positive electrode switch 31 and connected between the negative electrode terminal 12 and the negative electrode switch 32.

The controller 40 shifts the switch timings of the positive electrode switch 31 and the negative electrode switch 32 from the shut-off state (OFF) to the connected state (ON) from each other according to the presence or absence or the magnitude of the electrical capacitance (stray capacitance) generated between the positive electrode terminal 11 and the negative electrode terminal 12 of the fuel cell stack 10. In the present embodiment, since the stray capacitance Cip is generated between the positive electrode terminal 11 of the fuel cell stack 10 and the electrical circuit 20 and the stray capacitance Cin is generated between the negative electrode terminal 12 and the electrical circuit 20, the switch timing of the positive electrode switch 31 is shifted from that of the negative electrode switch 32.

In this way, electric charges accumulated in the stray capacitance Cip on the positive electrode side and the stray capacitance Cin on the negative electrode side are discharged at timings different from each other as shown in FIG. 3. Thus, a peak level of the surge current Is flowing into the electrical circuit 20 can be reduced.

Specifically, the controller 40 sets one of the positive electrode switch 31 and the negative electrode switch 32 ON and, thereafter, sets the other switch from OFF to ON to reduce a variation of the ground potential of 0 V serving as a reference when the electrical circuit 20 operates. In the present embodiment, the controller 40 switches the positive electrode switch 31 ON after switching the negative electrode switch 32 ON.

In this way, electric charges are discharged from the stray capacitance Cip on the positive electrode side after electric charges are discharged from the stray capacitance Cin on the negative electrode side with respect to the ground line (GND). Thus, the surge current Is flowing into the electrical circuit 20 can be distributed. Therefore, a variation width of the ground potential serving as a reference to be supplied to the electrical circuit 20 can be suppressed.

Further, in the present embodiment, the electrical circuit 20 is connected to the ground line (reference line) 21 to which the ground potential of 0 V is supplied. The controller 40 switches the other positive electrode switch 31 ON after the elapse of the standby time Ts after the one negative electrode switch 32 is switched ON. The standby time Ts is a time determined on the basis of the stray capacitance Cin present between the negative electrode switch 32 to be first switched ON and the ground line 21.

In this way, the surge current Is when the positive electrode switch 31 is turned ON and the surge current Is when the negative electrode switch 32 is turned ON flow into the electrical circuit 20 via the ground line 21 during periods different from each other. Thus, the peak level of the surge current Is can be reliably reduced.

(Second Embodiment)

Figure 6:
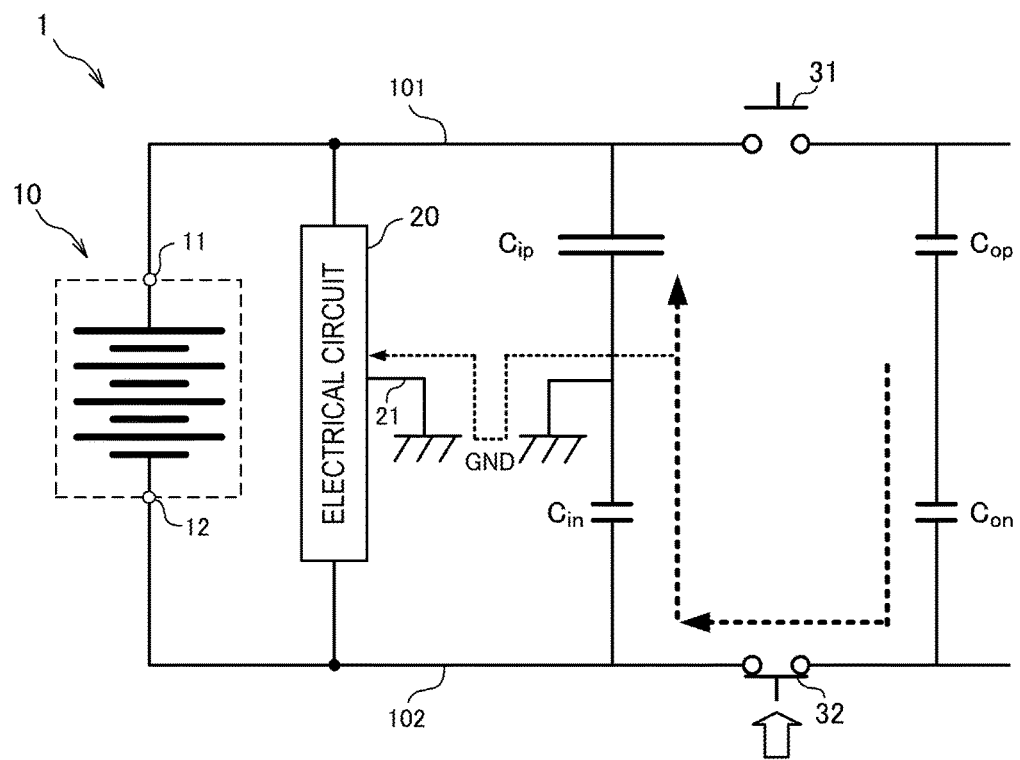
FIG. 6 is an equivalent circuit diagram showing the configuration of a fuel cell system according to a second embodiment of the present invention.

FIG. 6 shows an equivalent circuit showing the configuration of a fuel cell system in a second embodiment of the present invention. The fuel cell system of the present embodiment basically has the same configuration as the fuel cell system 1 shown in FIG. 1. In the following description, the same components as those of the fuel cell system shown in FIG. 1 are denoted by the same reference signs and not described in detail.

In the present embodiment, a stray capacitance Cip on a positive electrode side and a stray capacitance Cin on a negative electrode side formed in the fuel cell system 1 differ in magnitude from each other and the stray capacitance Cip on the positive electrode side is twice as large as the stray capacitance Cin on the negative electrode side.

For example, when a remaining voltage of a fuel cell stack 10 is "450 V", electric charges are charged into the stray capacitance Cip on the positive electrode side by a voltage of "150 V" and electric charges are charged into the stray capacitance Cin on the negative electrode side by a voltage of "−300 V". In this way, the smaller the stray capacitance Cin, the larger the voltage to be charged into the stray capacitance Cin.

When the fuel cell system 1 is started in such a state, a controller 40 first sets a negative electrode switch 32 ON out of a positive electrode switch 31 and the negative electrode switch 32, the negative electrode switch 32 being arranged near the stray capacitance Cin on the negative electrode side smaller than the stray capacitance Cip on the positive electrode side.

Associated with this, the stray capacitances Cin and Con on the negative electrode side are connected and a surge current Is flows into an electrical circuit 20 from a ground line 21 by the charging/discharging of the stray capacitances Cin and Con on the negative electrode side.

In this case, since the stray capacitance Cin on the negative electrode side is smaller than the stray capacitance Cip on the positive electrode side, a time during which electric charges are discharged from the stray capacitance Cin on the negative electrode side is shorter than a discharge time from the stray capacitance Cip on the positive electrode side. Thus, a time during which the surge current Is flows into the electrical circuit 20 is short, wherefore a switch time until the positive electrode switch 31 is switched ON after the negative electrode switch 32 is switched ON can be shortened.

Figure 7:
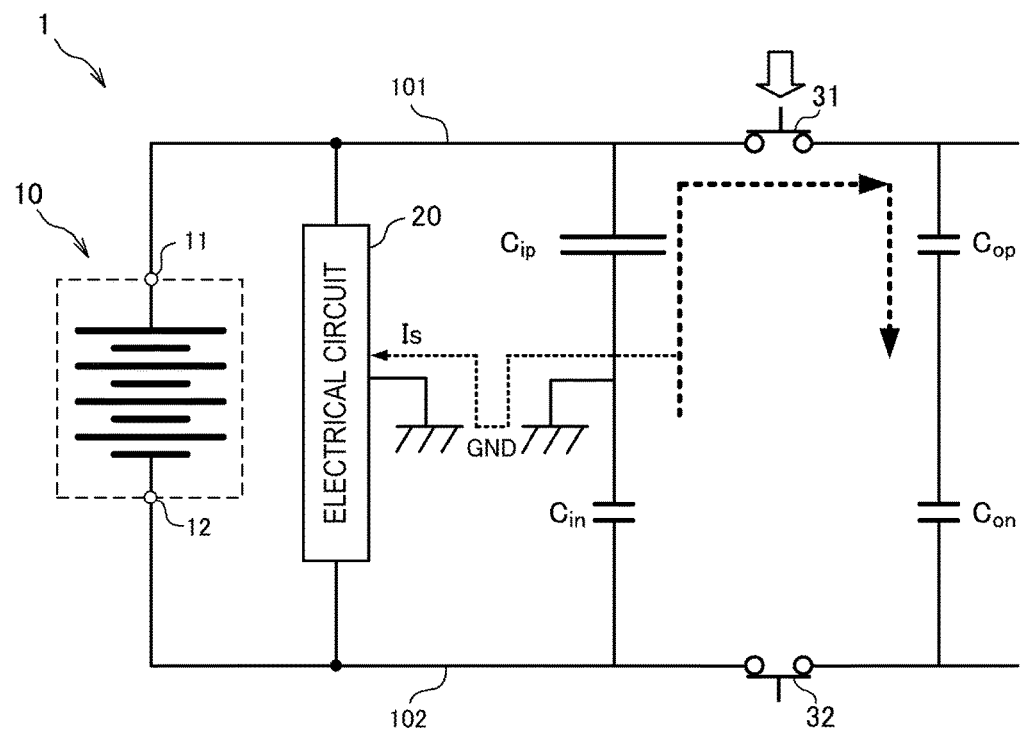
FIG. 7 is a diagram showing the flow of electric charges when a positive electrode switch is turned on after a negative electrode switch is turned on, FIG. 8 are time charts showing a technique for switching the positive electrode switch and the negative electrode switch in the second embodiment.

FIG. 7 is a diagram showing the flow of electric charges when the positive electrode switch 31 is set from OFF to ON.

The controller 40 sets the positive electrode switch 31 ON after switching the negative electrode switch 32 ON. Associated with this, the stray capacitances Cip and Cop on the positive electrode side are connected and the surge current Is flows into the electrical circuit 20 via a ground line (GND) by the charging/discharging of the stray capacitances Cip and Cop on the positive electrode side.

In this case, since the stray capacitance Cip on the positive electrode side is larger than the stray capacitance Cin on the negative electrode side, electric charges are moderately discharged from the stray capacitance Cip. Thus, a peak value of the surge current Is mixed into the electrical circuit 20 is small.

Further, by setting the positive electrode switch 31 ON, both the positive electrode switch 31 and the negative electrode switch 32 are in a connected state to form a closed loop. When the closed loop is formed, there is a possibility that electric charges are discharged also from the other stray capacitances and a current flowing in the closed loop becomes large. Thus, by switching the positive electrode switch 31 ON later out of the positive electrode switch 31 and the negative electrode switch 32, the positive electrode switch 31 causing a smaller peak value of the surge current Is, the mixture of an excessive surge current Is into the electrical circuit 20 can be prevented.

Figure 8:
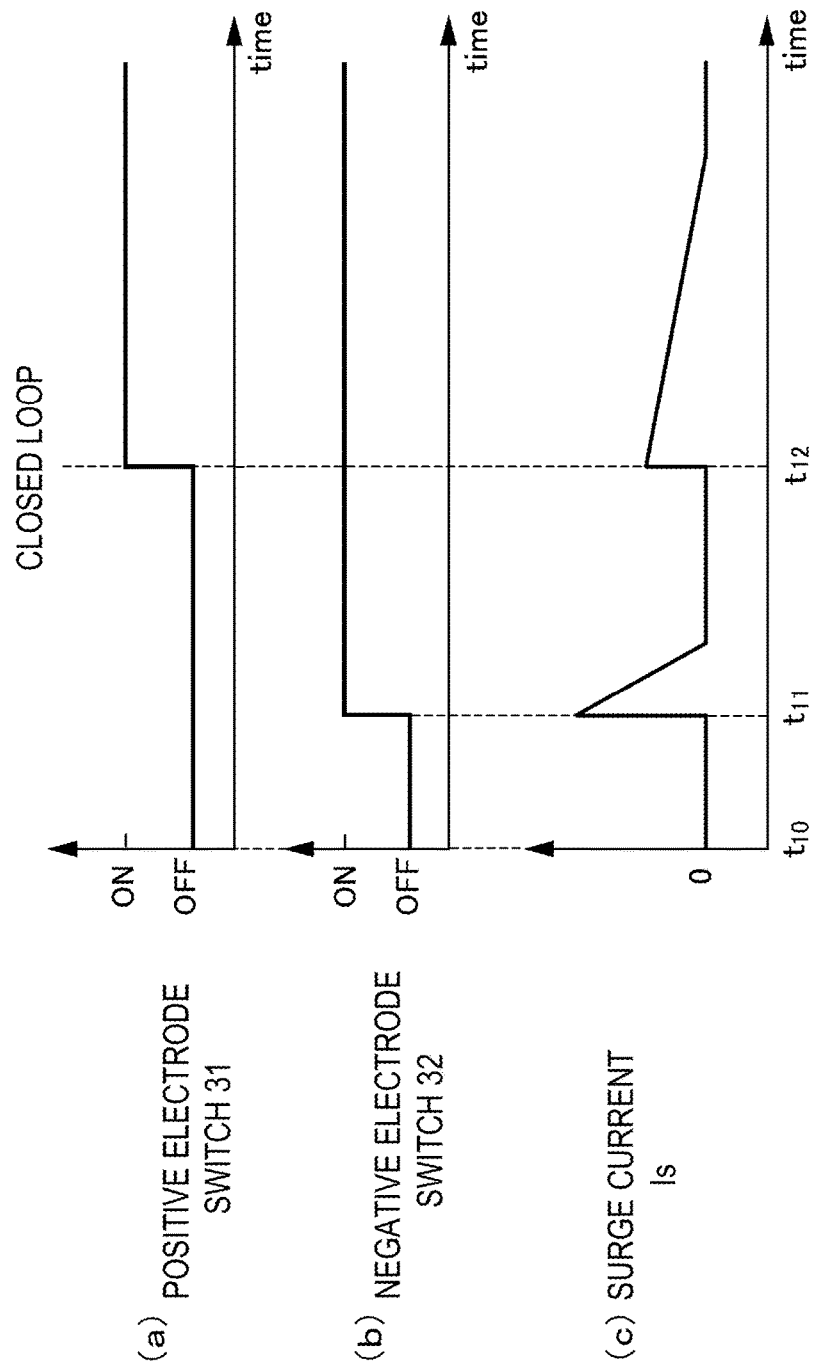

FIG. 8 are time charts showing a control method for controlling the positive electrode switch 31 and the negative electrode switch 32 in the present embodiment.

FIG. 8(a) is a chart showing the connected state of the positive electrode switch 31. FIG. 8(b) is a chart showing the connected state of the negative electrode switch 32. FIG. 8(c) is a chart showing the surge current Is mixed into the electrical circuit 20 via the ground line 21. It should be noted that a variation width is shown in an enlarged manner in FIG. 8(c) as compared to FIG. 3(c) to clarify a difference in the variation of the surge current Is.

At time t10, an operation switch of the fuel cell system 1 is set ON and the fuel cell stack 10 is started.

At time t11, the controller 40 sets only the negative electrode switch 32 ON with the positive electrode switch 31 kept OFF as shown in FIGS. 8(a) and 8(b). In this way, the stray capacitances Con and Cin on the negative electrode side are connected and electric charges move from the stray capacitance Con to the stray capacitance Cin on the negative electrode side.

At this time, since the stray capacitance Cin on the negative electrode side is larger than the stray capacitance Cip on the positive electrode side, a peak value of the surge current Is increases as shown in FIG. 8(c), but a time during which the surge current Is flows can be shortened.

Thereafter, the controller 40 confirms whether or not an elapsed time after the negative electrode switch 32 is switched ON has reached a standby time Ts.

The standby time Ts is a period determined in advance on the basis of the smaller one Cin of the stray capacitances Cin and Cin formed in the fuel cell system 1. In this way, it can be avoided that the positive electrode switch 31 is turned ON before the surge current Is by the turning-ON of the negative electrode switch 32 decreases.

When the elapsed time reaches the standby time Ts at time t12, the controller 40 switches the positive electrode switch 31 from OFF to ON as shown in FIG. 8(a). Since the stray capacitances Cop and Cip on the positive electrode side are connected in this way, electric charges move from the stray capacitance Cip to the stray capacitance Cop on the positive electrode side. Associated with this, electric charges flow from the stray capacitance Cin on the negative electrode side to the stray capacitance Cip on the positive electrode side and some of the electric charges flow as the surge current Is into the electrical circuit 20 via the ground line (GND).

Since the stray capacitance Cip on the positive electrode side is larger than the stray capacitance Cin on the negative electrode side, a peak value of the surge current Is becomes smaller as shown in FIG. 8(c). Thus, influences given to the electrical circuit 20 by the surge current Is can be reduced.

According to the second embodiment of the present invention, the switch having the smaller one of the electrical capacitances Cip and Cin present between the positive electrode switch 31, the negative electrode switch 32 and the electrical circuit 20 is first set ON by the controller 40. In the present embodiment, the negative electrode switch 32 is first switched ON since the stray capacitance Cin on the negative electrode side is smaller than the stray capacitance Cip on the positive electrode side.

In this way, a time during which the surge current Is is mixed into the electrical circuit 20 by the first discharging of the stray capacitance Cin becomes shorter, wherefore a switch time of the positive electrode switch 31 and the negative electrode switch 32 can be shortened.

Further, in the present embodiment, the electrical circuit 20 includes the insulation coupling circuit 20B configured to insulate the positive electrode terminal 11 and the negative electrode terminal 12 of the fuel cell stack 10, and the processing circuit 20C insulated from the positive electrode terminal 11 and the negative electrode terminal 12 by the insulation coupling circuit 20B and configured to process signals from the positive electrode terminal 11 and the negative electrode terminal 12. The processing circuit 20C is connected to the ground line (reference line) 21 for supplying a potential serving as a reference when the electrical circuit 20 operates.

The controller 40 switches the negative electrode switch 32, which has the smaller one of the stray capacitance Cip on the positive electrode side formed between the ground line 21 and the positive electrode switch 31 and the stray capacitance Cin on the negative electrode side formed between the ground line 21 and the negative electrode switch 32, from OFF to ON. Thereafter, the controller 40 switches the positive electrode switch 31 having a larger electrical capacitance from OFF to ON.

In this way, the peak value of the surge current Is mixed into the electrical circuit 20 by the second discharging of the stray capacitance Cip forming the closed loop becomes smaller. Thus, an operation failure of the electrical circuit 20 can be suppressed. Further, even if a discharging current in the closed loop increases due to the discharging of the stray capacitances other than the stray capacitances Cin and Cip of the fuel cell system 1, influences given to the electrical circuit 20 and other circuits can be reduced since the peak value of the surge current Is is reduced beforehand.

(Third Embodiment)

Figure 9:
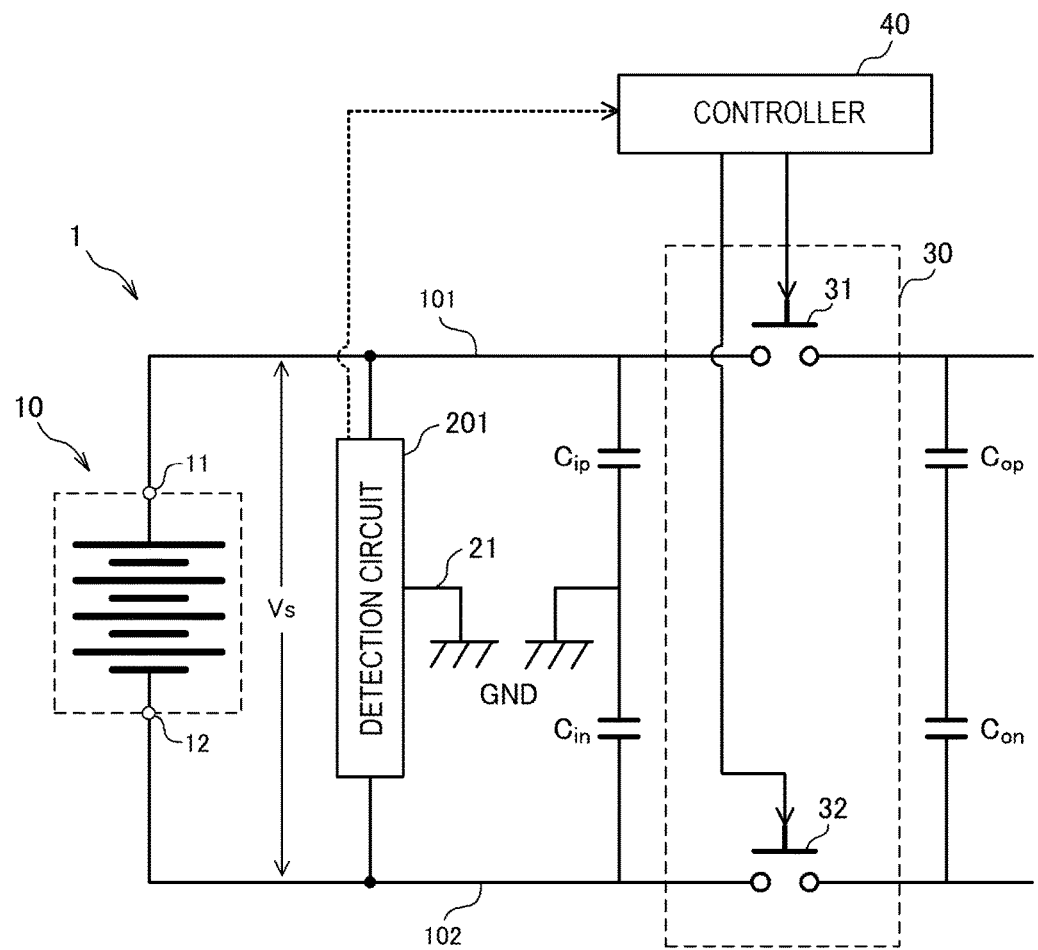
FIG. 9 is an equivalent circuit diagram showing the configuration of a fuel cell system in a third embodiment of the present invention.

FIG. 9 is a diagram showing the configuration of a fuel cell stack in a third embodiment of the present invention.

A fuel cell system 1 includes a detection circuit 201 as the electrical circuit 20 of the fuel cell stack shown in FIG. 1. Here, the same components as those of the fuel cell system shown in FIG. 1 are denoted by the same reference signs.

The detection circuit 201 detects a voltage Vs output from a fuel cell stack 10. The detection circuit 201 is connected in parallel to the fuel cell stack 10. The detection circuit 201 outputs a detection signal indicating the detection of the output voltage Vs of the fuel cell stack 10 to a controller 40.

The controller 40 controls switch timings of a positive electrode switch 31 and a negative electrode switch 32 on the basis of the detection signal output from the detection circuit 201.

Figure 10:
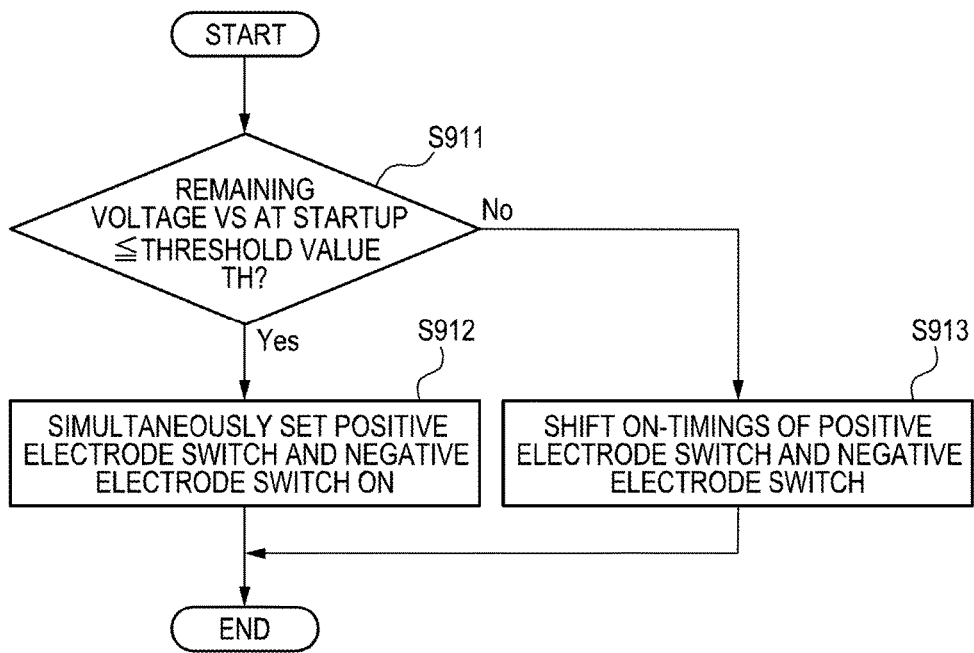
FIG. 10 is a flow chart showing a control method for fuel cell system.

FIG. 10 is a flow chart showing a processing procedure of a control method of the controller 40 for controlling the positive electrode switch 31 and the negative electrode switch 32 in the present embodiment.

First, the controller 40 supplies a power supply voltage to the detection circuit 201 and obtains a detection signal indicating a remaining voltage Vs of the fuel cell stack 10 from the detection circuit 201 when detecting that an operation switch of the fuel cell system 1 is set to a startup state. Specifically, the controller 40 detects the remaining voltage Vs of the fuel cell stack 10 immediately before the positive electrode switch 31 and the negative electrode switch 32 are switched ON.

In Step S911, the controller 40 judges whether or not the remaining voltage Vs indicated by the detection signal is not larger than a predetermined threshold value Th. The threshold value Th is determined on the basis of a value at which a surge current Is is allowable in the detection circuit 201. Specifically, the threshold value Th is set such that the surge current Is mixed into the detection circuit 201 by the discharging of the stray capacitances Cip and Cin does not exceed an allowable value.

In Step S912, the controller 40 judges that the amount of electric charges charged into the stray capacitances Cip and Cin is small and simultaneously sets the positive electrode switch 31 and the negative electrode switch 32 from OFF to ON if the remaining voltage Vs of the fuel cell stack 10 is not larger than the threshold value Th.

In this way, a time during which the positive electrode switch 31 and the negative electrode switch 32 are both set ON is made shorter. Thus, a startup time of the fuel cell stack 10 can be shortened.

In Step S913, the controller 40 judges that the amount of electric charges charged into the stray capacitances Cip and Cin is large and shifts timings at which the positive electrode switch 31 and the negative electrode switch 32 are set ON if the remaining voltage Vs of the fuel cell stack 10 is larger than the threshold value Th.

For example, as in the second embodiment, the controller 40 first turns on the switch having a smaller stray capacitance between the switch and a ground line 21 out of the positive electrode switch 31 and the negative electrode switch 32 and, thereafter, switches the other switch from OFF to ON.

When processings of Step S912 and S913 are completed, the procedure of a series of processings of the control method of the fuel cell system 1 is finished.

According to the third embodiment of the present invention, the controller 40 simultaneously switches the positive electrode switch 31 and the negative electrode switch 32 to the connected state if the remaining voltage Vs of the fuel cell stack 10 is smaller than the predetermined threshold value Th when the fuel cell system 1 is started. The threshold value Th is determined on the basis of the stray capacitances Cip and Cin formed between power supply lines 101 and 102 of the fuel cell system 1.

In this way, it can be avoided that connection timings of the positive electrode switch 31 and the negative electrode switch 32 are uselessly shifted. Thus, the startup time of the fuel cell system 1 can be shortened while a peak value of the surge current Is is suppressed.

Further, in the present embodiment, the detection circuit 201 for detecting the voltage Vs of the fuel cell stack 10 is provided as the electrical circuit 20 in the fuel cell system 1. The controller 40 switches the one negative electrode switch 32 to the connected state earlier than the other positive electrode switch 31 if the remaining voltage Vs of the fuel cell stack 10 exceeds the threshold value Th when the fuel cell system 1 is started.

In this way, the peak value of the surge current Is mixed into the detection circuit 201 via the ground line 21 can be reduced. Accordingly, it is possible to suppress a reduction in the detection accuracy of the voltage Vs of the fuel cell stack 10 at the startup of the fuel cell system 1.

(Fourth Embodiment)

Figure 11:
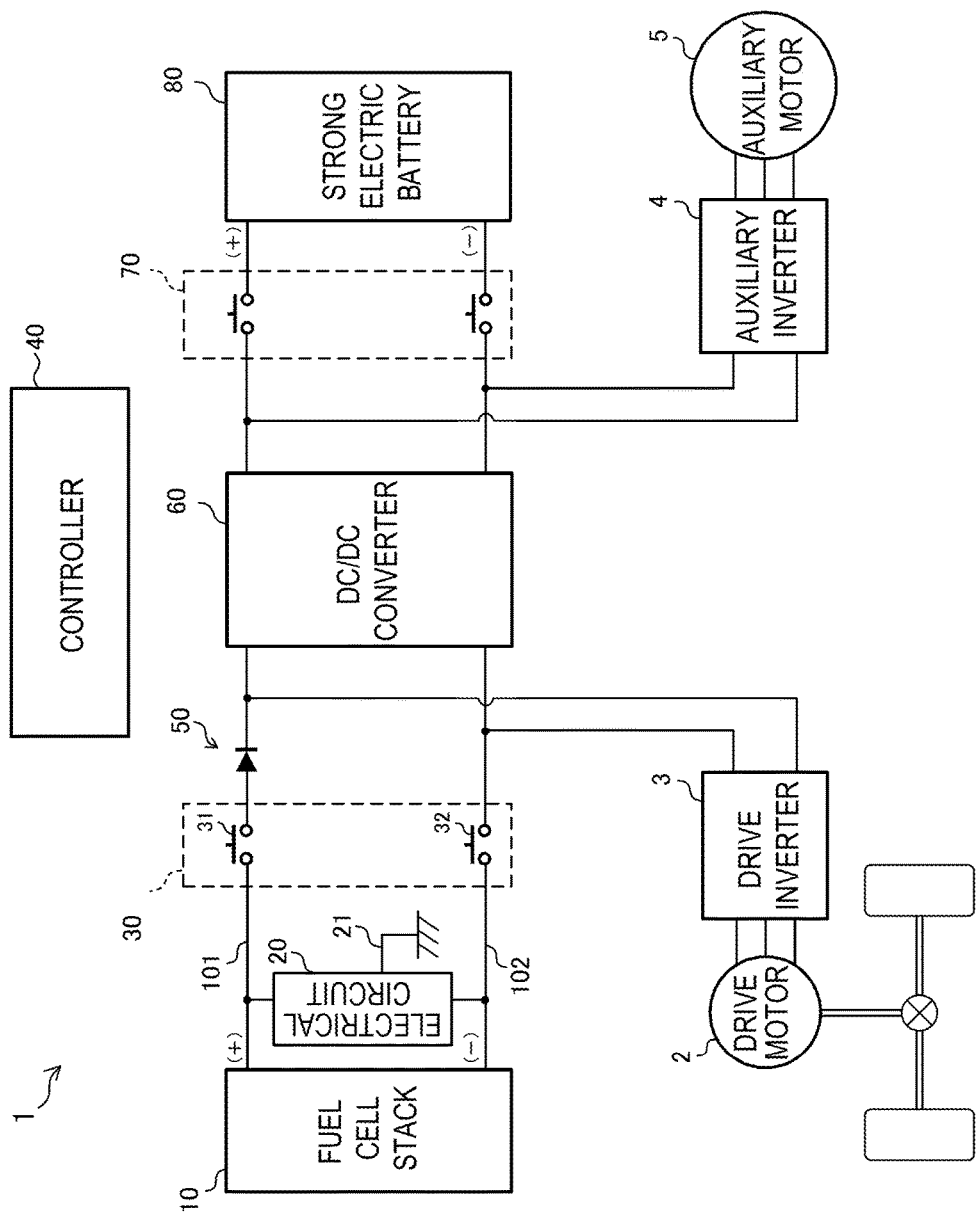
FIG. 11 is a diagram showing an example of the configuration of the fuel cell system.

FIG. 11 is a diagram showing an example of the configuration of a fuel cell system 1 in a fourth embodiment of the present invention.

The fuel cell system 1 includes a drive motor 2, a drive inverter 3, an auxiliary inverter 4, an auxiliary motor 5, a backflow preventing diode 50, a DC/DC converter 60, a breaker 70 and a strong electric battery 80 in addition to the components shown in FIG. 1.

The drive motor 2 is an electric motor for driving a vehicle. The drive motor 2 is, for example, a three-phase AC motor.

The drive inverter 3 converts a DC voltage supplied from a fuel cell stack 10 by the DC/DC converter 60 into an AC voltage and supplies that AC voltage to the drive motor 2.

The backflow preventing diode 50 is connected between a positive electrode switch 31 and the DC/DC converter 60. The backflow preventing diode 50 allows the passage of a current output from the fuel cell stack 10 and shuts off a current output from the DC/DC converter 60 to the fuel cell stack 10.

The DC/DC converter 60 boosts at least one of a DC voltage output from the fuel cell stack 10 and a DC voltage output from the strong electric battery 80.

The breaker 70 mechanically shuts off the strong electric battery 80 from the auxiliary inverter 4 and the DC/DC converter 60. The breaker 70 is controlled by a controller 40.

For example, the breaker 70 shuts off the strong electric battery 80 from the auxiliary inverter 4 and the DC/DC converter 60 when the fuel cell system 1 is stopped and connects the strong electric battery 80 to the auxiliary inverter 4 and the DC/DC converter 60 when the fuel cell system 1 is started.

The strong electric battery 80 is, for example, a lithium-ion battery of 300 V (volts). The strong electric battery 80 accumulates regenerative power generated by the drive motor 2. The strong electric battery 80 is connected to each of the auxiliary inverter 4 and the DC/DC converter 60 by the breaker 70.

The auxiliary inverter 4 converts a DC voltage supplied from the fuel cell stack 10 by the DC/DC converter 60 into an AC voltage and supplies that AC voltage to the auxiliary motor 5.

The auxiliary motor 5 drives a compressor 212 for supplying cathode gas to the fuel cell stack 10.

The controller 40 sets the breaker 70 to a connected state and causes a voltage of the DC/DC converter 60 on the side of the fuel cell stack 10 to be higher than the voltage Vs of the fuel cell stack 10 by a voltage output from the strong electric battery 80.

In this way, a current no longer flows from the DC/DC converter 60 to the fuel cell stack 10. On the other hand, a current flowing from the DC/DC converter 60 to the fuel cell stack 10 is shut off by the backflow preventing diode 50. Thus, arc discharge generated when the breaker 70 is connected can be prevented.

Thereafter, the controller 40 switches one of the positive electrode switch 31 and the negative electrode switch 32 from OFF to ON and, thereafter, switches the other switch from OFF to ON. Since a surge current mixed into the electrical circuit 20 via the ground line 21 is temporally distributed in this way, a peak level of the surge current can be reduced.

Although the embodiments of the present invention have been described above, the above embodiments are merely an illustration of some application examples of the present invention and not intended to limit the technical scope of the present invention to the specific configurations of the above embodiments.

For example, although the example of using the fuel cell stack 10 as a laminated battery, in which a plurality of battery cells are laminated, has been described in the above embodiments, a laminated lithium battery may be, for example, used. Even a cell system with an electrical circuit connected to a lithium battery can obtain effects of the present invention as in the above embodiments.

Further, in the above embodiments, the controller 40 is configured to shift the switch timings of both the positive electrode switch 31 and the negative electrode switch 32 by shifting a transmission timing of a control signal for setting the positive electrode switch 31 ON and that of a control signal for setting the negative electrode switch 32 ON. Without limitation to this, signals may be transmitted from the controller 40 to the positive electrode switch 31 and the negative electrode switch 32 at the same timing and a delay circuit may be provided between the controller 40 and the positive electrode switch 31 or the negative electrode switch 32.

Further, although the example in which the detection circuit 201 for detecting a voltage of the fuel cell stack 10 is provided as the electrical circuit 20 has been described in the above embodiment, a current detection circuit connected to the positive electrode switch 11 of the fuel cell stack 10 and configured to detect a current output from the fuel cell stack 10 may be provided as the electrical circuit 20. For example, the current detection circuit is provided with a detection resistor connected between the positive electrode terminal 11 and the positive electrode switch 31 of the fuel cell stack 10 and an internal circuit for detecting voltages generated at both ends of this detection resistor with a potential of the ground line 21 as a reference. Even such a current detection circuit can reduce the surge current Is mixed via the ground line 21 by shifting ON-timings of the positive electrode switch 31 and the negative electrode switch 32.

It should be noted that the above embodiments can be appropriately combined.

The invention claimed is:

1. A cell system, comprising:
a laminated battery including a plurality of battery cells laminated in the laminated battery;
a first switch connected to a positive electrode of the laminated battery and configured to switch connection of the positive electrode to a shut-off state,
a second switch connected to a negative electrode of the laminated battery and configured to switch connection of the negative electrode to a shut-off state,
a circuit configured to be connected at least either between the positive electrode and the first switch or between the negative electrode and the second switch; and
a controller configured to shift control timings of the first switch and the second switch from the shut-off state to a connected state according to an electrical capacitance generated between the positive electrode and the negative electrode.

2. The cell system according to claim 1, wherein:
the controller sets one of the first switch or the second switch to the connected state and, thereafter, sets an other of the first switch or the second switch from the shut-off state to the connected state to reduce a variation of a potential serving as a reference when the circuit operates.

3. The cell system according to claim 1, wherein:
the controller first switches, out of the first switch or the second switch, a switch having a smaller electrical capacitance formed between the switch and the circuit to the connected state.

4. The cell system according to claim 1, further comprising:
a fuel cell system including fuel cells, the fuel cells being battery cells wherein the fuel cell system is configured to generate power by supplying anode gas and cathode gas to the fuel cells;
wherein the controller simultaneously switches the first switch and the second switch to the connected state if a voltage of the laminated battery is lower than a predetermined threshold value when the fuel cell system is started.

5. The cell system according to claim 4, wherein:
the circuit includes a detection circuit configured to detect a voltage of the laminated battery; and
if the voltage of the laminated battery exceeds the predetermined threshold value when the fuel cell system is started, the controller switches one of the first switch or the second switch to the connected state earlier than an other of the first switch or the second switch.

6. The cell system according to claim 1, wherein:
the circuit is connected to a reference line configured to supply a potential serving as a reference when the circuit operates; and
the controller switches one switch of the first switch or the second switch to the connected state after an elapse of a time determined on a basis of a magnitude of an electrical capacitance between the reference line and an other switch of the first switch or the second switch after switching the other switch to the connected state.

7. The cell system according to claim 6, wherein:
the circuit comprises:
an insulating circuit configured to insulate the positive electrode and the negative electrode of the laminated battery; and
a processing circuit insulated from the positive electrode and the negative electrode by the insulating circuit and configured to process signals from the positive electrode and the negative electrode;
the processing circuit is connected to the reference line; and
the controller is configured to switch to the connected state, out of the first switch or the second switch, a switch having a smaller one of an electrical capacitance formed between the reference line and the first switch and an electrical capacitance formed between the reference line and the second switch, and, thereafter, the controller is configured to switch an other of the first switch or the second switch, having a larger electrical capacitance, to the connected state.

8. A control method for a cell system with a laminated battery having a plurality of battery cells laminated in the laminated battery, a first switch connected to a positive electrode of the laminated battery, a second switch connected to a negative electrode of the laminated battery, and a circuit configured to be connected at least between the positive electrode and the first switch or between the negative electrode and the second switch, the control method comprising:

switching connection of the positive electrode to a shut-off state by the first switch;

switching connection of the negative electrode to a shut-off state by the second switch; and shifting control timings of the first switch and the second switch from the shut-off state to a connected state according to an electrical capacitance generated between the positive electrode and the negative electrode.

* * * * *